(12) United States Patent
Narayanaswami

(10) Patent No.: US 6,182,113 B1
(45) Date of Patent: Jan. 30, 2001

(54) DYNAMIC MULTIPLEXING OF HYPERLINKS AND BOOKMARKS

(75) Inventor: Chandrasekhar Narayanaswami, Wilton, CT (US)

(73) Assignee: International Business Machines Corporation, Armonk, NY (US)

(*) Notice: Under 35 U.S.C. 154(b), the term of this patent shall be extended for 0 days.

(21) Appl. No.: 08/931,796

(22) Filed: Sep. 16, 1997

(51) Int. Cl.$^7$ ........................................... G06F 15/16
(52) U.S. Cl. .................. 709/203; 709/206; 709/223; 709/224
(58) Field of Search ........................ 709/223, 224, 709/245, 203

(56) References Cited

U.S. PATENT DOCUMENTS

| | | | |
|---|---|---|---|
| 5,813,007 | * 9/1998 | Nielsen | 709/224 |
| 5,862,325 | * 1/1999 | Reed et al. | 709/223 |
| 5,907,322 | * 5/1999 | Kelly et al. | 709/223 |
| 5,917,491 | * 6/1999 | Bauersfeld | 709/224 |

OTHER PUBLICATIONS

"HTML 3.2 Reference Specification", W3C Recommendation, Dave Raggett, Jan. 14, 1997.
"World Wide Web Consortium Publishes Public Draft of HTML 4.0", Press Release Jul. 15, 1997.
"Dynamic HTML: The Next Generation of User Interface Design Using HTML", Microsoft Corporation, Feb. 1997.

* cited by examiner

*Primary Examiner*—Zarni Maung
*Assistant Examiner*—Farzaneh Farahi
(74) *Attorney, Agent, or Firm*—Perman & Green, LLP; Jay Sbrollini

(57) ABSTRACT

Apparatus and a method are disclosed for operating a data processing system that is coupled to a data communications network. The method includes a first step of storing a plurality of Bookmarks, individual ones of which refer to one of a plurality of data communications network sites, wherein each of the plurality of data network communications network sites provides a similar type of information. A second step designates one of the plurality of Bookmarks as a currently active Bookmark based on at least one criterion. In one embodiment the step of designating is executed in response to a user selecting a Multiplexed Bookmark that comprises the plurality of Bookmarks, while in another embodiment the step of designating is executed periodically. The at least one criterion can be, by example, a time of day, a location of the data processing system, or a bandwidth of a data communications link between the data processing system and the data communications network. In another aspect this invention teaches apparatus and a method for operating a World Wide Web (WWW) Server of a type that maintains WWW pages, at least some of which contain at least one Hyperlink. A first step receives a request for a particular Hyperlink, and a second step formats a response to the request for the particular Hyperlink in accordance with at least one criterion that is associated with a requestor of the Hyperlink. In this case the at least one criterion can be a time of day at a location of the requestor, a location of the requestor, or a bandwidth of a data communications link between the requestor and the data communications network.

41 Claims, 7 Drawing Sheets

DYNAMIC MULTIPLEXING OF HYPERLINKS AND BOOKMARKS

FIELD OF THE INVENTION

This invention relates generally to data communications systems and networks and, in particular, to interactions between client computers and world wide web (WWW) servers that provide web pages.

BACKGROUND OF THE INVENTION

It is known that those types of web pages that are periodically updated in the world wide web, such as news pages, weather pages, traffic reports, etc., can be updated at different times of the day. For example, a weather report on web page A at a first server may be updated at 3 p.m., while a weather report on web page B at a second server may be updated at 6 p.m. In another example stock quotes may be updated at 10:28 a.m. at one site and at 10:34 a.m. at another site. This implies that at a given time of day certain Hyperlinks are more up to date and, thus, more useful than other Hyperlinks. In like manner the location of, and the bandwidth (e.g., bits/sec) of, the user's connection may also change the relative usefulness of Hyperlinks. It can be thus realized that the relative usefulness of a user's Bookmarks can also vary with the time of day (TOD), user's location (L), and user's link bandwidth (LBW).

A given Hyperlink will include a Uniform Resource Locator (URL) that is a specification of the location of a link (a synonym for Hyperlink). In general, a URL specifies the protocol (http:// for a web page), site name, path and file name to a resource.

Bookmarks are well known to those that access the Internet, as they are provided by web browsers as a shortcut route to user-selected web pages. In general, a user can specify that a certain web page be placed in the Bookmarks file. When this occurs the web browser stores the network address of the web page in association with a descriptive text string. If the user subsequently clicks on a certain Bookmark, the web page associated with the stored network address is automatically accessed.

One problem present in existing web browsers is that Bookmarks and Hyperlinks are static, and thus ignore the effects of time of day, location and link bandwidth. This triad of user information (TOD, L, LBW) can be referred to for the purposes of this invention as a User Information Triad (UUT).

At the web server end of the connection, and in accordance with one known technique, the contents of a web page can be modified in accordance with a manually entered zip code.

It is also known that a user may write a special program to recreate his Bookmarks folder based on time, location, and link bandwidth. However, it is unrealistic in most cases to require users of the WWW to write a program to update their Bookmarks. As such, a need exists for simple, unified and consistent way to program Bookmarks.

Current web browsers allow some reconfiguration to match the user's link bandwidth. This is currently limited to turning off images and using text-based web pages. However, this existing capability is not configurable on a per web page basis, and thus is less useful than it appears.

Other solutions, such as one known as WebExpress™, send differential data to the browser. This is useful in some cases, e.g., a form accepting a stock symbol can be cached and only the varying stock symbol need be exchanged.

At present, no direct solutions that are known to the inventor adapt Hyperlinks and Bookmarks based on the user's location. For example, if a user is in California and the local time is 8 p.m., he may wish to download a driver for a graphics card from a web server in New York, where the local time is 11 p.m. and the network loading is presumably lower.

The recent development of the Dynamic Hypertext Markup Language (HTML), while a significant improvement over HTML 3.2, does not address the above issues. Reference in this regard may be had to the following documents: "HTML 3.2 Reference Specification, W3C Recommendations", D. Raggett, Jan. 14, 1997; and "Dynamic HTML: The Next Generation of User Interface Design Using HTML", Microsoft Corporation, February 1997.

OBJECTS AND ADVANTAGES OF THE INVENTION

It is an object and advantage of this invention to simplify navigation of the world wide web based on one or more of the current time, the location of the user, and the available bandwidth.

It is a further object and advantage of this invention to provide a method and apparatus for dynamically reconfiguring Hyperlinks and Bookmarks.

SUMMARY OF THE INVENTION

The foregoing and other problems are overcome and the objects of the invention are realized by methods and apparatus in accordance with embodiments of this invention.

In one aspect this invention teaches apparatus and a method for operating a data processing system that is coupled to a data communications network. The method includes a first step of storing a plurality of Bookmarks, individual ones of which refer to one of a plurality of data communications network sites, wherein each of the plurality of data network communications network sites provides a similar type of information. A second step of the method designates one of the plurality of Bookmarks as a currently active Bookmark based on at least one criterion. In one embodiment the step of designating is executed in response to a user selecting a multiplexed Bookmark that comprises the plurality of Bookmarks, while in another embodiment the step of designating is executed periodically during the operation of the data processing system. In a presently preferred embodiment of this invention the individual ones of the data communications network sites are each comprised a World Wide Web Server.

The at least one criterion can be a time of day, a location of the data processing system, or a bandwidth of a data communications link between the data processing system and the data communications network.

The step of designating includes an initial step of operating an n-dimensional scheduler for specifying individual ones of the Bookmarks in association with the at least one criterion.

In another aspect this invention teaches apparatus and a method for operating a World Wide Web (WWW) Server of a type that maintains WWW pages, at least some of which contain at least one Hyperlink. A first step of the method receives a request for a particular Hyperlink, and a second step formats a response to the request for the particular Hyperlink in accordance with at least one criterion that is associated with a requestor of the Hyperlink. In this case the at least one criterion can be a time of day at a location of the requestor, a location of the requestor, or a bandwidth of a data communications link between the requestor and the data communications network.

The step of receiving a request also includes a step of receiving information that is descriptive of the at least one criterion. In one embodiment a HTTP Request format is modified to include information that is descriptive of at least one of a time of day at the requestor, a location of the requestor, or a bandwidth of a data communications link between the requestor and the data communications network. In another embodiment the network address of the requestor is received with the request and is used to derive at least one of the location or time of day of the requestor. In either embodiment, the step of formatting the response to the request for the particular Hyperlink formats the response in accordance with the received information.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
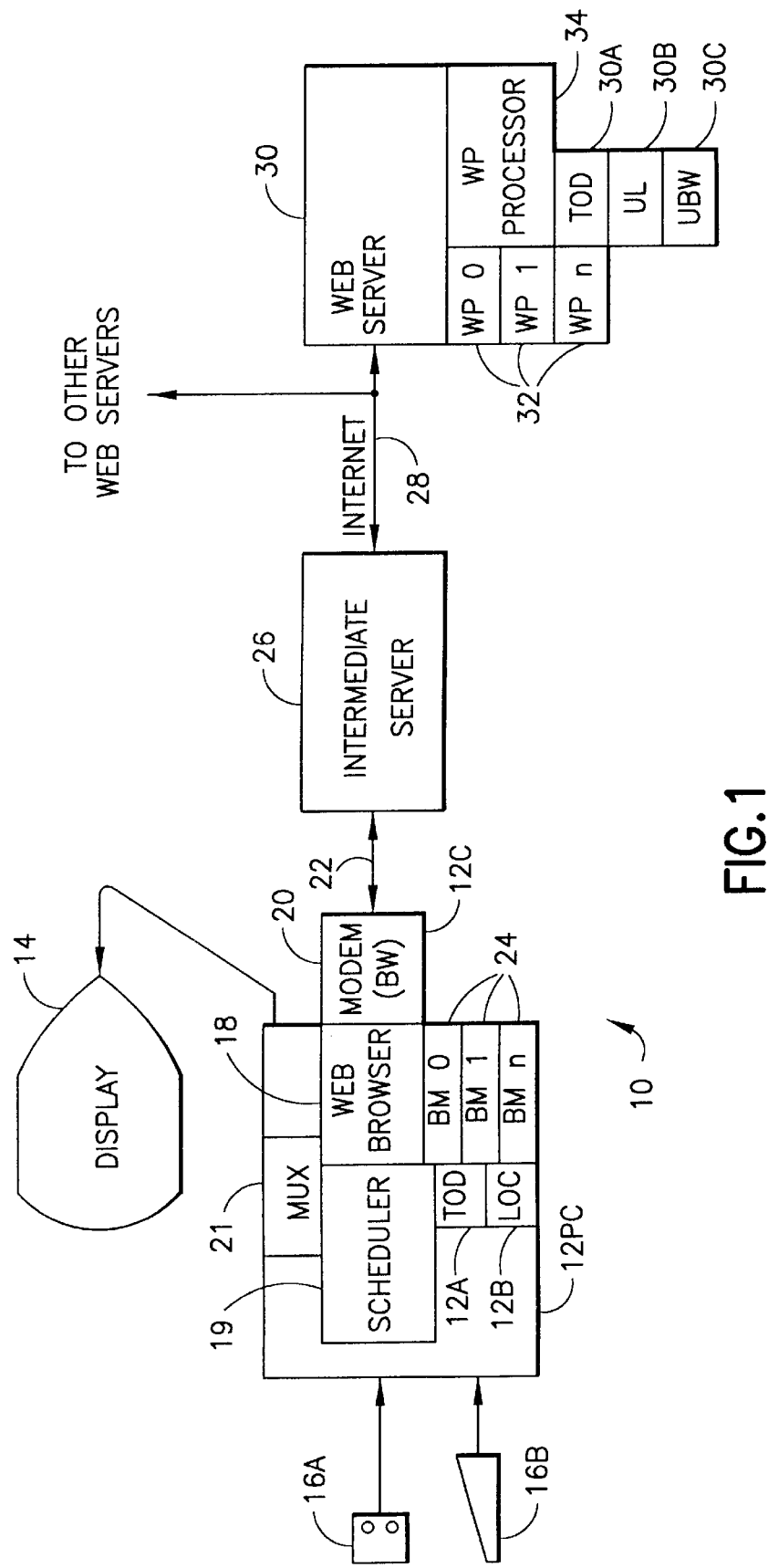
FIG. 1 is a block diagram of a data communications network and system that is constructed and operated in accordance with this invention, the system including a client personal computer (PC), a network, and a web server.

Reference is made to FIG. 1 for illustrating a data communications network and system 10 that is constructed and operated in accordance with the teaching of this invention. A workstation or personal computer, referred to herein as a client (PC) 12, is configured to have a display 14 and an input device, such as a pointing device 16A and/or a keyboard 16B. The client PC 12 runs under the control of software, and includes a Web Browser 18. The Web Browser 18, for the purposes of this invention, is assumed to be client PC program for accessing and rendering WWW documents in HTML. The Web Browser 18 is connected through a wired or wireless interface, such as a dial up modem 20, to a local telephone line, thereby providing a dial up connection 22. By example only, the modem 20 may operate at a speed of 28.8 kbps. Through the use of the Web Browser 18, display 14, and pointing device 16B the user is enabled to access World Wide Web (WWW) sites and pages, download desired WWW pages, and click on Hyperlinks contained in downloaded web pages to gain access to desired information. As was described earlier, a given Hyperlink will include a Uniform Resource Locator (URL) that is a specification of the location of a link (a synonym for Hyperlink). In general, a URL specifies the protocol (http:// for a web page), site name, path and file name to a resource. Several such URLs can be stored in a memory of the PC 12.

In FIG. 1 the Web Browser 18 is shown as being interfaced to at least one Intermediate Server 26, which may or may not be the user's local Internet service provider, through the dial up connection 22 having a data transfer capability of, typically, some tens of kilobits per second. The Intermediate Server 26 is connected, in turn, to the Internet 28 through a significantly higher speed connection, which may be a fiber optic packet data connection having a data transfer capability of some number of megabits per second. The use of the Intermediate Server 26 is not required for the operation of this invention, as a direct network connection may be employed, as may also a network access through a proxy server.

Also connected to the Internet 28 are a plurality of Web Servers 30, only one of which is illustrated. A given Web Server 30 stores or has access to information of interest, such as weather information, financial information, graphical information, etc. A plurality of Web Servers 30 may each provide a similar type of information. By example, a large number of Web Servers 30 may each provide stock market quotations, while a number of others may each provide weather information.

In order to quickly access a given Web Server 30 (i.e., a desired WWW site), the PC 12 also stores a plurality of Bookmarks 24 (BM 0–BM n). For the purposes of this invention a set of Bookmarks is essentially a list of selected URLs that are saved locally for quick access from the Web Browser 18.

In accordance with this invention the Web Browser 18 is modified, or another program or software entity is employed (a Bookmark Multiplexer 21 (MUX)) in conjunction with the Web Server 18, to provide Multiplexed Bookmarks. Related to this feature, the PC 12 includes at least one of a time of day (TOD) clock 12A, an indication of a location (LOC) 12B of the PC 12 (either a user-inputted location or a location obtained from some other means, such as a Global Positioning System (GPS) interface), and an indication of the connection bandwidth (BW) 12C. Further in accordance with this invention the client PC 12 includes a software entity referred to as a Bookmark scheduler 19 (described in detail below).

Further in accordance with this invention the Web Server 30 may include a plurality of WWW pages 32 (WP0–WPn), a Web Page Processor 34, and indications of the TOD 30A (locally and/or at a given user's location), a given user's location 30B (UL), and a given users's connection bandwidth 30C (UBW).

Having described the overall architecture of the system 10, a description will now be made of several important aspects of this invention. A first aspect of this invention, which mainly concerns the client PC 12, is directed towards the multiplexing of Bookmarks. A second aspect of this invention, which mainly concerns the Web Browser 30, is directed towards extending Hyperlinks such that the Hyperlinks can be multiplexed.

Multiplexing Bookmarks

Figure 2:
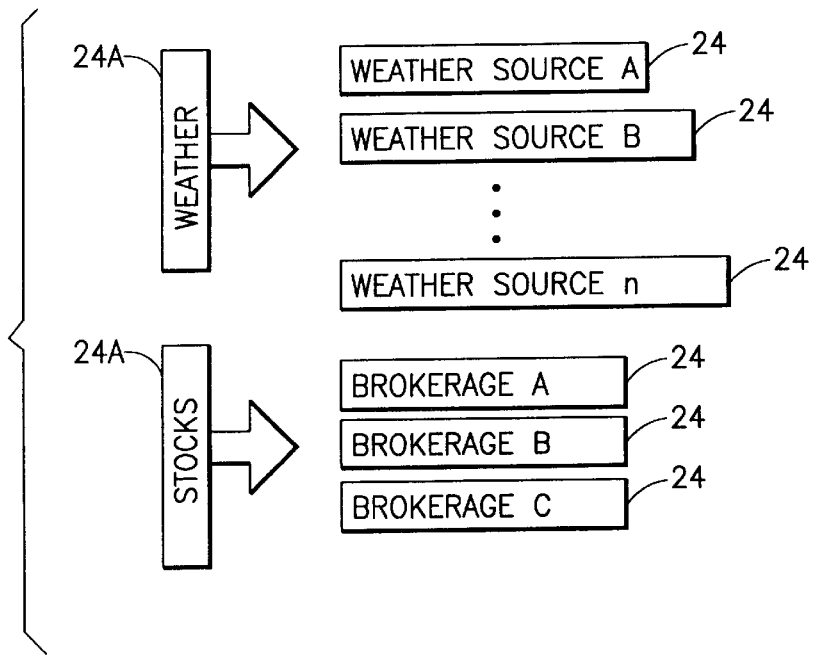
FIG. 2 illustrates two exemplary multiplexed Bookmarks in accordance with this invention.

Referring to FIG. 2, in accordance with this aspect of the invention those links that point to alternative sources for similar information, e.g., weather source A, weather source B, . . . , weather source n, or brokerage A, brokerage B, . . . , brokerage n, are grouped together into one Bookmark 24 (e.g., "weather", "stocks") which is referred to as a Multiplexed Bookmark 24A. For each of the links within a given Multiplexed Bookmark 24A, a time window for which the link has the most up to date information is specified by the user through an interface that is similar to a calendar scheduler. This interface is embodied in the Bookmark scheduler 19 shown in FIG. 1.

The Bookmark scheduler 19 allows the user to enter and define periodic events. The Bookmark scheduler 19 may also automatically infer certain information when the links contain meta-data, as allowed in HTML 3.2, for specifying a web page update schedule.

Meta-data refers to a conventional HTML tag used in the Head area of a document to specify further information about the document, either for the local server, or for a remote browser. The Meta element is used within the Head element to embed document meta-information not defined by other HTML elements. Such information can be extracted by servers/clients for use in identifying, indexing, and cataloging specialized document meta-information. In addition, HTTP servers can read the contents of the document head to generate response headers corresponding to any elements defining a value for an attribute HTTP-EQUIV. The use of the meta element thus is also specified to provide document authors with a mechanism for identifying information that should be included in response headers of a HTTP Request.

In accordance with this invention, when the user wishes to retrieve, by example, a weather forecast, indicated by the user clicking on or otherwise specifying the "weather" Multiplexed Bookmark 24A, the Bookmark multiplexer 21 selects the most appropriate link by comparing the present time from the TOD 12A with the predetermined schedule stored in the scheduler 19. When identifying the most appropriate link that particular link or Bookmark 24 is selected and its associated URL is employed to access the corresponding Web Server 30.

In a further embodiment of the invention the meta-data from each Bookmark 24 in the Multiplexed Bookmark 24A is examined to determine which Bookmark 24 is associated with the most recently updated information, and the identified link is fetched. The meta-data can be examined periodically in an automatic fashion to maintain a currently active Bookmark 24, or at the time that the Multiplexed Bookmark 24A is selected by the user.

The Multiplexed Bookmarks 24A may also be configured by bandwidth considerations. For example, and referring to FIG. 3A, if the user is accessing weather information when connected to the WWW through a relatively low bandwidth phone line, the user may configure the scheduler 19 to retrieve weather information from a WWW server 30 that gives a maximum information in a text format with a minimum bandwidth. However, when connected instead with a higher bandwidth link, such as a LAN connection as in FIG. 3B, the user may instead choose a WWW server 30 that provides a higher bandwidth satellite image. With this invention, this type of Bookmark configuration is available on a per-page basis.

Figure 12:
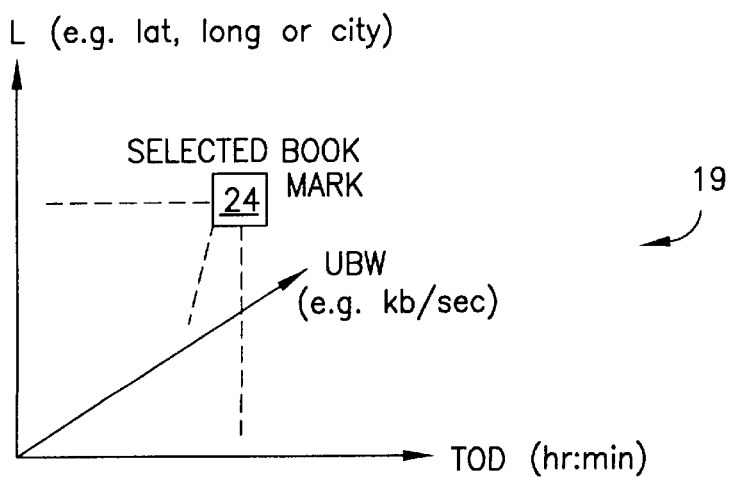
FIG. 12 is a conceptual illustration of a three dimensional Bookmark scheduler in accordance with an aspect of this invention.

In general, and referring to FIG. 12, the scheduler 19 can be considered to generate Multiplexed Bookmarks 24A in the form of an n-dimensional construct having, by example, time of day on one axis, user link interface bandwidth (UBW) on another axis, and user location (L) on yet another axis. Other axes corresponding to, by example, the day of the week, Internet service provider, and/or type of encryption supported, can also be employed. The end result is that a particular link or Bookmark 24 is selected based on one or more variables (e.g., TOD, UBW, L) that are resolved at the time the Multiplexed Bookmark 24A is selected by the user, or that are resolved periodically so as to maintain a list of currently active links or Bookmarks 24.

Figure 3A:
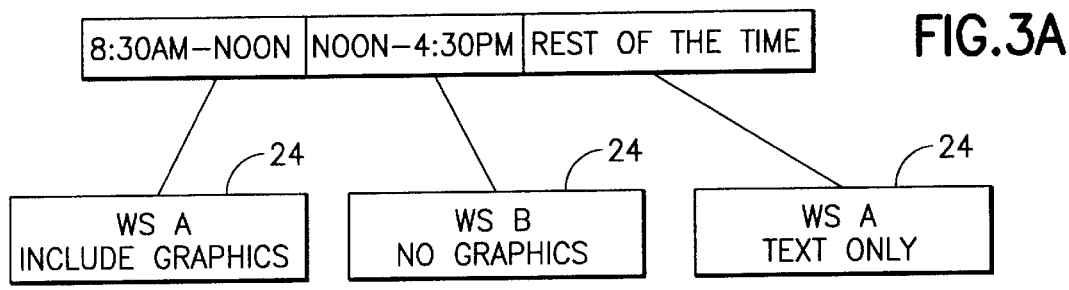
FIG. 3A illustrates a first exemplary Bookmark schedule that is based on time and a first user bandwidth.
Figure 3B:
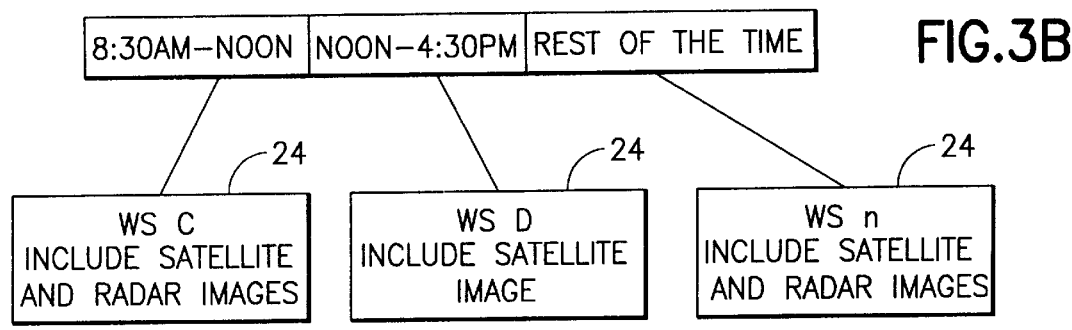
FIG. 3B illustrates a second exemplary Bookmark schedule based on time and a second user bandwidth.

Referring to FIGS. 3A and 3B for the case of a two dimensional scheduler 19 (TOD and UBW), and when operating on a lower bandwidth phone line connection, a particular weather source Bookmark 24 is selected as a function of the time of day from a set of weather source Bookmarks 24 that comprise the weather source Multiplexed Bookmark 24A, while when operating on a higher bandwidth LAN connection a different weather source Bookmark 24 can be selected as a function of the time of day. The particular choice of the Bookmarks 24 can be made by the user based on a number of criteria. By example, the choice of the weather source B from noon until 4:30 p.m. can be made based on an anticipated amount of network loading during this time of day, and the selection of no graphical information can be made to avoid an expected longer download time. In addition, two separate Bookmarks 24 corresponding to two different WWW pages for the weather source A can be specified, one having text and graphics, and one having text only.

A user may also configure the scheduler 19 such that regardless of bandwidth, during certain periods (e.g., 8 a.m. to 5 p.m.) the user will receive succinct instead of verbose weather reports.

Figure 4:
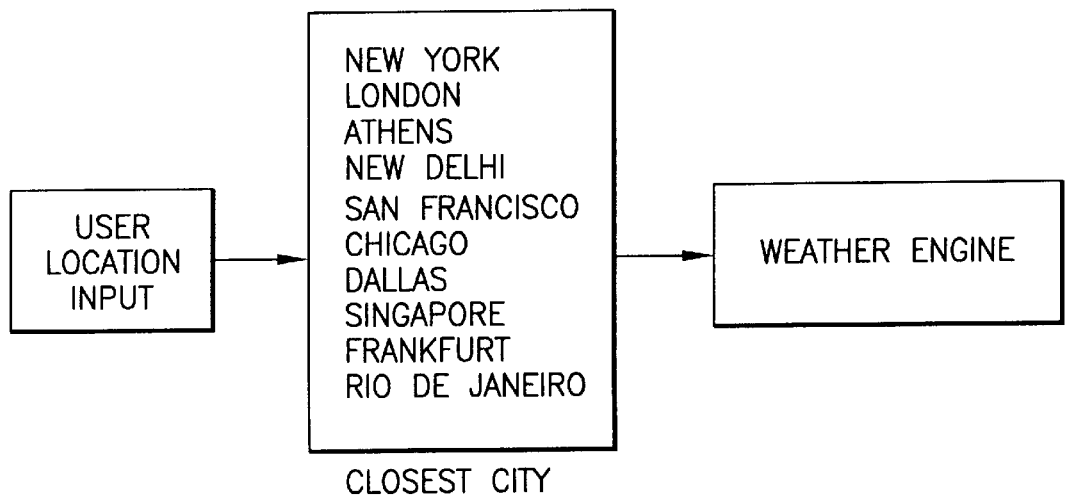
FIG. 4 illustrates a selection of a Bookmark based on user location.

Referring to FIG. 4, and in accordance with a user or GPS or some other inputted location (e.g., city or latitude and longitude) a weather Bookmark 24 is selected based on a closest major city to the user's inputted location. By example, if it is indicated that the user is located close to Dallas, a weather forecast for Dallas is selected from a weather source city list, as opposed to a weather forecast for Chicago or London. This location selection could be combined with the TOD and UBW criteria of FIGS. 3A and 3B. It is also within the scope of the invention to obtain the weather forecast from a web server 30 that is physically located closest to the user's indicated position.

When the Web Browser 18 (or the multiplexer program 21) is started, it determines the TOD 12A using the system clock, the connection bandwidth 12C (BW) from the modem 20, and the location 12B (LOC) of the user (either interactively or by a GPS or similar aid), and then determines the currently active link for each Multiplexed Bookmark 24A. In a mobile PC an interactive program or a GPS-based reordering of active links may be performed.

In one embodiment of this invention, and after some period of operation (e.g., every five minutes), the Web Browser 18 or multiplexer 21 reevaluates the currently active links, based on, by example, TOD, BW, and LOC, and thereby maintains an updated set of active links.

Figure 5:
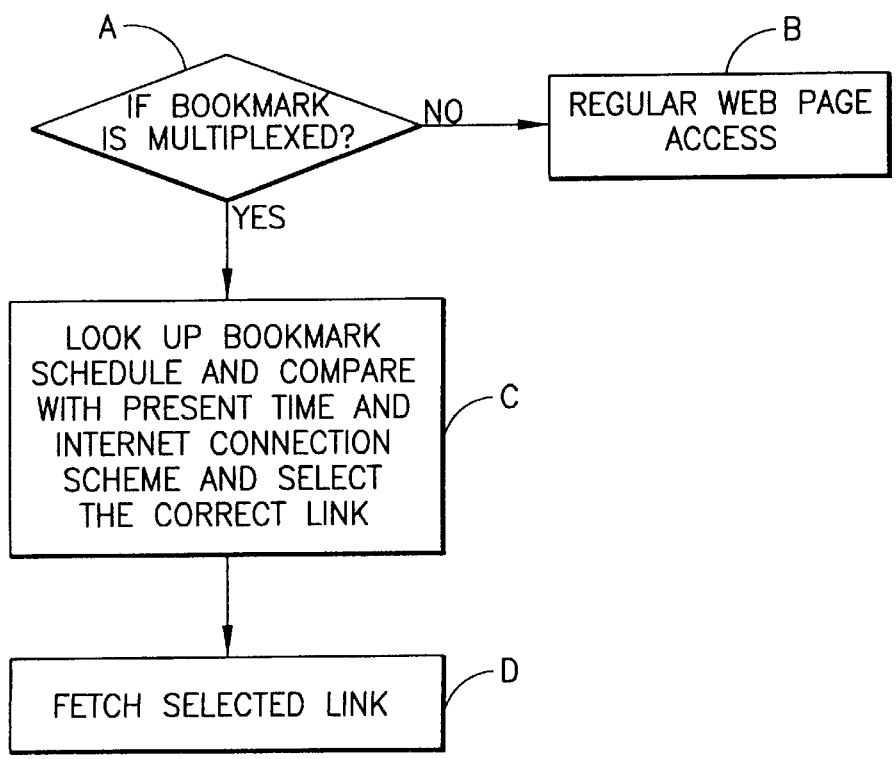
FIG. 5 is a logic flow diagram that illustrates a method executed by the client PC for selecting from scheduled Bookmarks.

Alternatively, and referring to FIG. 5, if the user were to select the "weather" Multiplexed Bookmark 24A, the Web Browser 18 or multiplexer 19 first makes a determination (Block A) if the selected Bookmark is multiplexed (not all bookmarks maintained by the client PC 12 need be multiplexed). If no, control passes to Block B to perform a regular Web Page access. If yes at Block A, control passes to Block C to access the scheduler 19 and to employ the user-specified criterion or criteria (e.g., TOD, or TOD and LOC, or TOD, LOC, and UBW) to select the active weather link or Bookmark 24. Control then passes to Block D to fetch the selected active link from the corresponding Web Server 30.

As such, in one case the set of multiplexed active links is periodically and automatically updated, whereas in the other case the identity of the active link is determined or resolved at the time that the user selects the Multiplexed Bookmark 24A.

Figure 6:
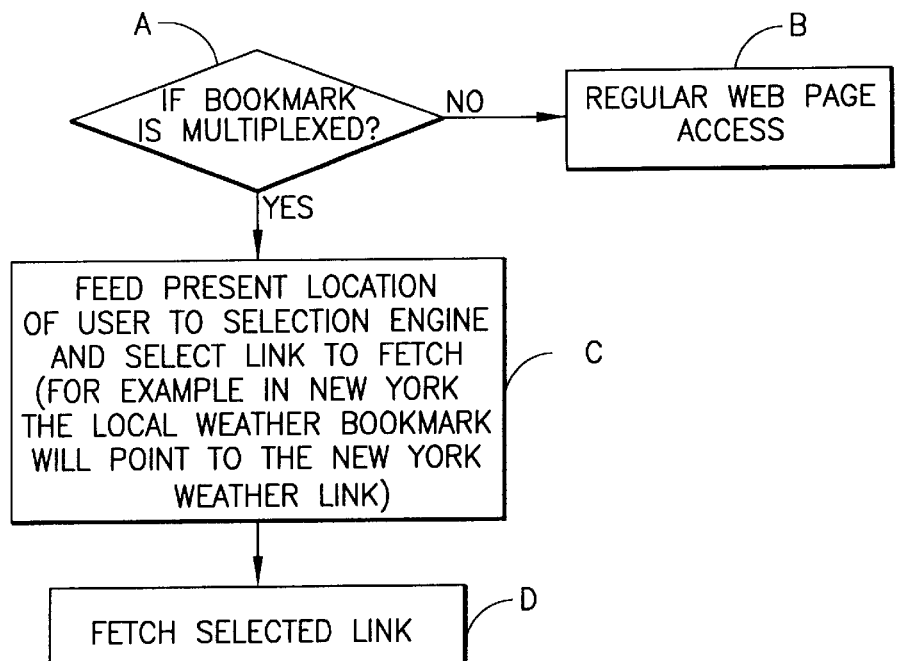
FIG. 6 is a logic flow diagram that illustrates a method executed by the client PC for selecting a Bookmark using a user's location as input.

Referring to the further example shown in FIG. 6, if the user were to select the "weather" Multiplexed Bookmark 24A the Web Browser 18 or multiplexer 19 first makes the determination (Block A) if the selected Bookmark is multiplexed. If no, control passes to Block B to perform a regular Web Page access. If yes at Block A, control passes to Block C to feed the current location 12B of the client PC 12 to the link selection engine (Web Browser 18 or Multiplexer 21) and to select the link to fetch based on the current location. Control then passes to Block D to fetch the selected active link from the corresponding Web Server 30.

Figure 7:
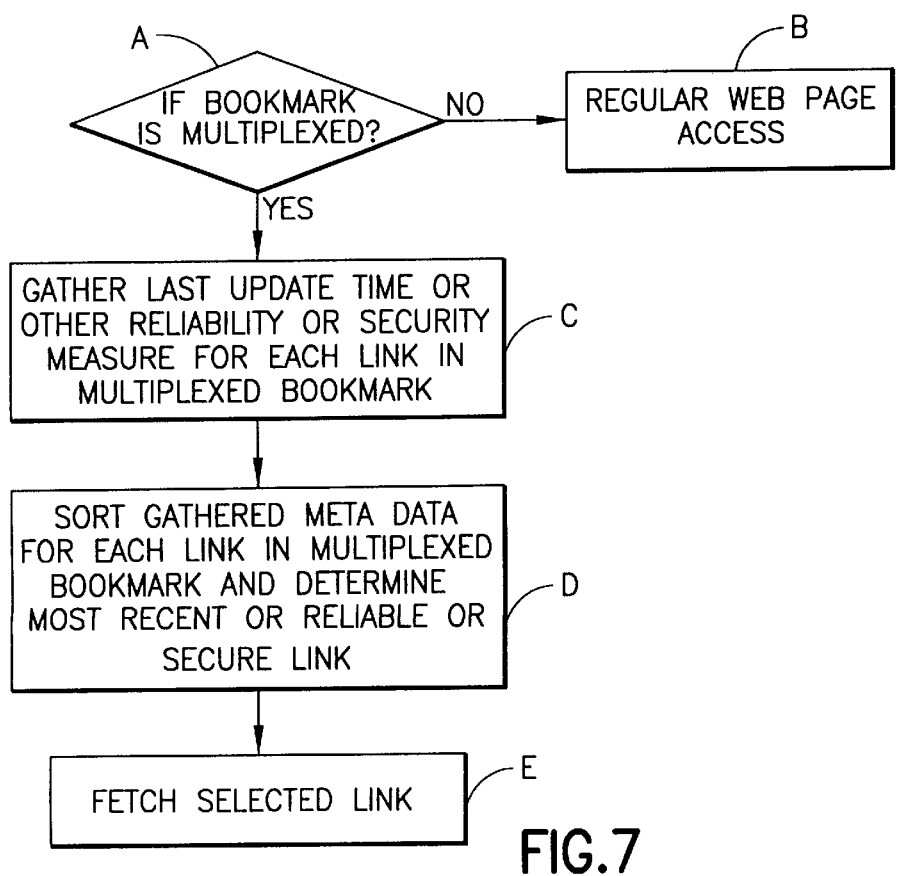
FIG. 7 is a logic flow diagram that illustrates a method executed by the client PC for selecting from multiplexed Bookmarks.

FIG. 7 illustrates a method wherein the above-described meta-data is used in selecting a link. At Block A the user selects a Bookmark and the Web Browser 18 or multiplexer 19 first makes the determination if the selected Bookmark is a Multiplexed Bookmark 24A. If no, control passes to Block B to perform a regular Web Page access. If yes at Block A, control passes to Block C to gather from the HTML meta-data the last update time or some other reliability or security measure for each link in the selected Multiplexed Bookmark 24A. At Block D the gathered meta-data for each link is sorted and a decision is made as to which link is the most-recently updated (in cooperation with the TOD 12A), or the most reliable, or the most secure (e.g., which link supports encryption, or which link supports a user-specified type of encryption). The size of the link could also be considered. For example, the meta-data may indicate that one link has a page size of 2 Mbytes, while another link has a page size of only 50 Kbytes. In this case the link having the smaller page size may be preferred and selected. At Block E the selected link is fetched from the corresponding Web Server 30.

As should be apparent from the foregoing description, the teaching of this invention can be used for obtaining several types of real-time information, such as weather reports, stock quotes, traffic conditions, news reports, etc. An added advantage of Bookmark multiplexing is that it reduces screen clutter by reducing the number of displayed Bookmarks, an important consideration when using a data processing device with a small screen. That is, and by example, not all weather source Bookmarks 24 need be displayed to the user, but only the weather source Bookmark that has been determined (based on TOD, BW, LOC, etc.) to be the currently active weather source Bookmark 24.

Multiplexing Hyperlinks

A Hyperlink on a web page 32 that is maintained by the WWW server 30 may also be multiplexed. The active choice of one of a plurality of Hyperlinks can depend on at least one of the time of day, bandwidth, and location of the user, i.e., the above-described User Information Triad (UUT). The active choice is determined by executing a program on the WWW server 30, using the web page processor 34, when the Hyperlink is selected by the user of the PC 12. The time (TOD 30A) at the Web Server 30 may also be used as a factor to periodically change the active Hyperlink.

In general, the web page processor 34 is a data processor for formatting a response to a request for a particular Hyperlink in accordance with at least one criterion that is associated with a requestor of the Hyperlink.

In one aspect this invention employs a modification to an existing HTTP Request protocol so as to include the UUT. That is, when the user clicks on a Hyperlink the resulting HTTP request sent from the Web Browser 18 is modified to encode all or some of the UUT information.

Alternatively, it is within the scope of this invention to automatically obtain an indication of the user's location from the user's network address (e.g., an identification of the Intermediate Server 26, which may be associated with a local Internet provider). Based on the user's address the WP Processor 34 can perform a table lookup or some equivalent procedure to obtain an approximate location of the client PC 12. Having obtained the approximate location of the client PC 12, the WP Processor 34 may then also determine, if desired, the TOD at the location of the client PC 12. In this case, and assuming that the BW 12C is not required by the Web Server 30, no modification to existing HTTP protocols may be required. This technique also does not require the user to manually enter any location specific information, such as a zip code, area code, or city name, as the required information is encoded automatically within the HTTP Request.

In accordance with a further aspect of this invention, default selections in a form could also make use of this information. An example is a weather report form that automatically lists California as the default state for weather reports if the user accessing the form is determined to be located in California. Other default location-related selections that could be automatically filled in by the WP Processor 34 include the user's area code, zip code, etc. Such defaults could be useful in devices where scrolling across a long list is cumbersome.

Further by example, a link that allows a download of software may automatically point to a Web Server 30 that is geographically closest to the user.

Figure 8A:
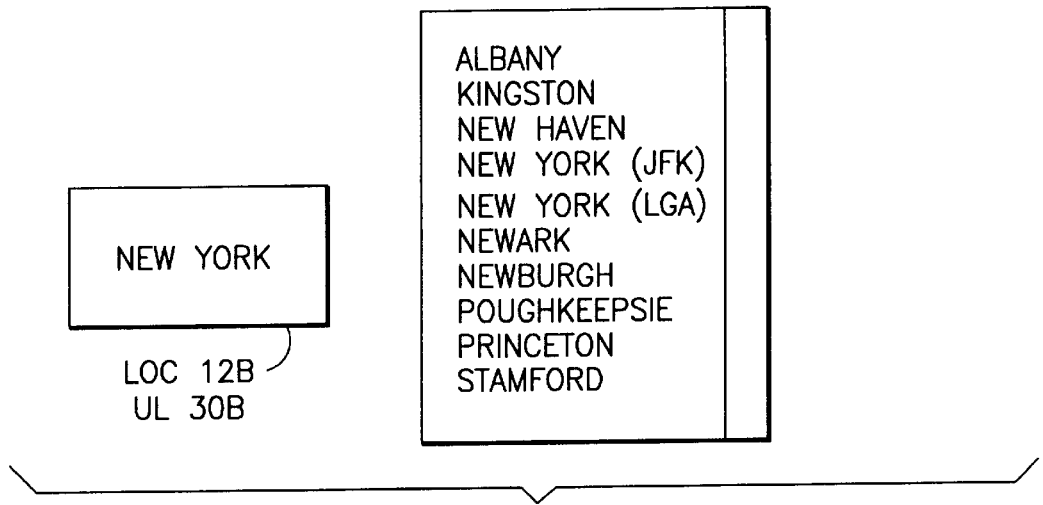
FIGS. 8A and 8B are each an example of a method executed by the web server for selecting a Hyperlink definition based on a user's location.
Figure 8B:
Figure 11:
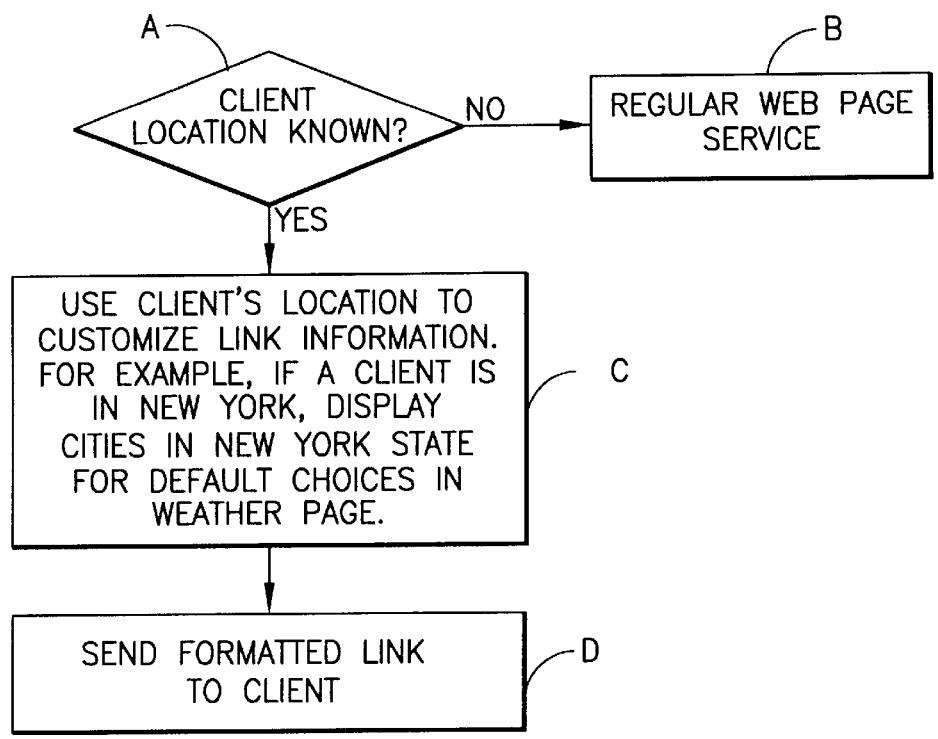
FIG. 11 is a logic flow diagram that illustrates a method executed by the web server to use a client PC's location to customize a web page.

Referring also to FIG. 11, at Block A a determination is made if the location (UL 30B) of the client PC 12 is known by the WP Processor 34. If no, control passes to Block B to provide conventional web page service. If yes at Block A, control passes to Block C where the UL 30B is employed to customize the Hyperlink information. By example, if the UL 30B indicates that the client PC 12 is located in New York state, the information is displayed at Block D to the user with a default list of cities in New York state from which the user may obtain weather information (see FIG. 8A). If the user UL 30B instead indicates California, then the information is instead customized to and displayed at Block D to the user with a default list of cities in California from which the user may obtain weather information (see FIG. 8B).

Further by example, assume that a displayed WWW page describes a product or service and includes a Hyperlink "Local Representatives". The user of the client PC 12 clicks on this Hyperlink and a HTTP Request is formatted and transmitted to the Web Server 30. Based on the UL 30B, which is transmitted with the HTTP Request or otherwise automatically determined by the Web Server 30, as described above, the response is formatted to include a list of representatives that are within some predetermined distance from the location of the client PC 12. In this manner a user in Tokyo would receive a list of representatives in the Tokyo area, while a user in Paris would receive a list of representatives in Paris, or elsewhere if Europe in there is no representative in the vicinity of Paris.

Also by example, a user with a low bandwidth link may be pointed to web pages 32 with fewer graphical images than a user having a higher bandwidth link.

Figure 9:
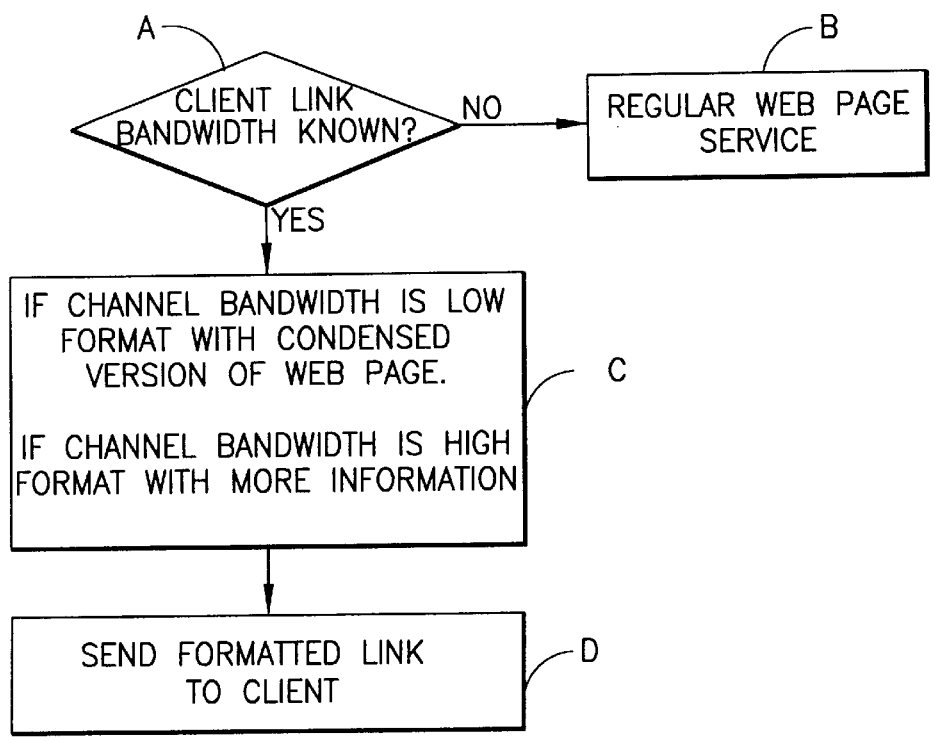
FIG. 9 is a logic flow diagram that illustrates a method executed by the web server to employ a client PC's link bandwidth to format a web page.

In this regard, and referring to FIG. 9, at Block A a determination is made if the bandwidth 12C of the client PC 12 is known by the WP Processor 34. If no, control passes to Block B to provide conventional web page service. If yes at Block A, control passes to Block C where, if the BW 12C is low (i.e., below some predetermined BW threshold) a condensed version (e.g., no graphics) of the requested web page 32 is formatted, else the requested web page 32 is formatted to include more information. At Block D the formatted web page is transmitted to the client PC 12.

Figure 10:
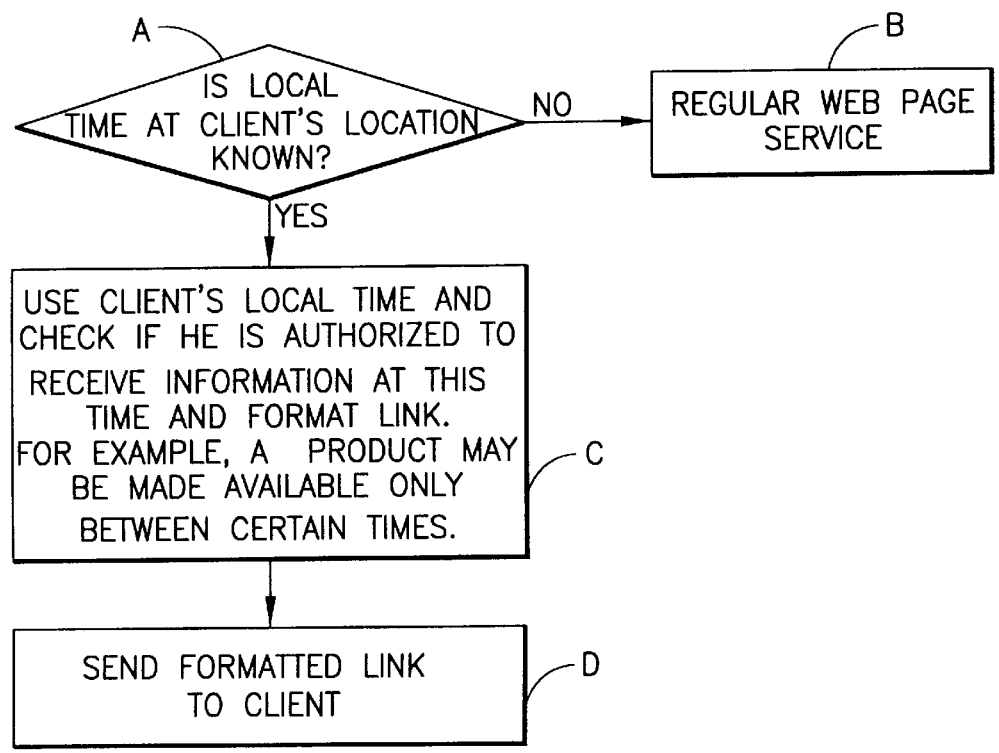
FIG. 10 is a logic flow diagram that illustrates a method executed by the web server to employ a local time at a client PC location as input for formatting a web page.

Further by example, and referring to FIG. 10, at Block A a determination is made if the TOD 12A at the client PC 12 is known by the WP Processor 34. If no, control passes to Block B to provide conventional web page service. If yes at Block A, control passes to Block C where, by example, a check is made to determine if the client PC 12 is authorized to receive the information at the current TOD. By example, certain information may only be available between the hours of 8:00 a.m. and 1:00 p.m. If the TOD at the client PC 12 is determined to be within the allowed time window, then control passes to Block D to send the requested web page 32, else the request is refused.

As was made evident above, other parameters, in addition to time, location, and link bandwidth, can be used to control the Bookmark and Hyperlink multiplexers of this invention.

While the invention has been particularly shown and described with respect to preferred embodiments thereof, it will be understood by those skilled in the art that changes in form and details may be made therein without departing from the scope and spirit of the invention.

What is claimed is:

1. A method for operating a data processing system that is coupled to a data communications network, comprising the steps of:
   storing a plurality of Bookmarks individual ones of which refer to one of a plurality of data communications network sites, each of the plurality of data network communications network sites providing a similar type of information; and
   designating one of the plurality of Bookmarks as a currently active Bookmark based on at least one criterion specified in accordance with at least one of a plurality of variables associated with the data processing system.

2. A method as in claim 1, wherein the step of designating is executed in response to a user selecting a multiplexed Bookmark that comprises the plurality of Bookmarks.

3. A method as in claim 1, wherein the step of designating is executed periodically during the operation of the data processing system.

4. A method as in claim 1, wherein the at least one criterion is a time of day.

5. A method as in claim 1, wherein the at least one criterion is a location of the data processing system.

6. A method as in claim 1, wherein the at least one criterion is a bandwidth of a data communications link between the data processing system and the data communications network.

7. A method as in claim 1, wherein the at least one criterion is expressed as meta-data.

8. A method as in claim 1, wherein the step of designating includes an initial step of operating an n-dimensional scheduler for specifying individual ones of said Bookmarks in association with said at least one criterion.

9. A method as in claim 1, wherein the step of designating includes an initial step of operating an n-dimensional scheduler for associating individual ones of said Bookmarks with at least one of a time of day, a location of the data processing system, or a bandwidth of a data communications link between the data processing system and the data communications network, and wherein the step of designating designates one of the plurality of Bookmarks as a currently active Bookmark based on at least one a current time of day, a current location of data processing system, or a current bandwidth of the data communications link between the data processing system and the data communications network.

10. A method as in claim 1, wherein individual ones of the data communications network sites are each comprised a World Wide Web Server.

11. A method for operating a World Wide Web (WWW) Server of a type that maintains WWW pages, at least some of which contain at least one Hyperlink, comprising the steps of:
   receiving a request for a particular Hyperlink from a data processing system connected to the World Wide Web; and
   formatting a response to the request for the particular Hyperlink in accordance with at least one criterion associated with a requestor of the Hyperlink, the criterion being specified in accordance with at least one of a plurality of variables associated with said data processing system; the at least one criterion being automatically determined by the WWW Server based on information encoded in the request.

12. A method as in claim 11, wherein the step of formatting is executed in response to the requestor selecting a multiplexed Hyperlink.

13. A method as in claim 11, wherein the at least one criterion is a time of day at a location of the requestor.

14. A method as in claim 11, wherein the at least one criterion is a location of the requestor.

15. A method as in claim 11, wherein the at least one criterion is a bandwidth of a data communications link between the requestor and the data communications network.

16. A method as in claim 11, wherein the step of receiving a request also includes a step of receiving information that is descriptive of at least one of a time of day at the requestor, a location of the requestor, or a bandwidth of a data communications link between the requestor and the data communications network, and wherein the step of formatting the response to the request for the particular Hyperlink formats the response in accordance with the received information.

17. A method as in claim 11 wherein the step of receiving a request also includes a step of receiving a network address of the requestor, and further comprising a step of deriving information from the network address that is descriptive of the at least one criterion.

18. A method as in claim 11 wherein the step of receiving a request also includes a step of receiving a network address of the requestor, and further comprising steps of:
   deriving at least one of a current time of day or a current location of the requestor from the network address; and using the derived information when formatting the response.

19. A data processing system, comprising:
a network interface for coupling the data processing system to a data communications network;
a user interface for receiving information from a user and for presenting information to the user;
a memory for storing a plurality of Bookmarks individual ones of which refer to one of a plurality of data communications network sites, each of the plurality of data network communications network sites providing a similar type of information; and
a Multiplexed Bookmark software entity for designating one of the plurality of Bookmarks as a currently active Bookmark based on at least one criterion specified in accordance with at least one of a plurality of variables associated with the data processing system.

20. A data processing system as in claim 19, wherein said Multiplexed Bookmark software entity is invoked in response to the user selecting a multiplexed Bookmark that comprises the plurality of Bookmarks.

21. A data processing system as in claim 19, wherein said Multiplexed Bookmark software entity is periodically invoked during the operation of the data processing system.

22. A data processing system as in claim 19, wherein the at least one criterion is a time of day.

23. A data processing system as in claim 19, wherein the at least one criterion is a location of the data processing system.

24. A data processing system as in claim 19, wherein the at least one criterion is a bandwidth of said network interface.

25. A data processing system as in claim 19, wherein the at least one criterion is expressed as meta-data.

26. A data processing system as in claim 19, and further comprising an n-dimensional scheduler software entity that is responsive to user inputs received through said user interface for specifying individual ones of said Bookmarks in association with said at least one criterion.

27. A data processing system as in claim 19, and further comprising an n-dimensional scheduler software entity that is responsive to user inputs received through said user interface for associating individual ones of said Bookmarks with at least one of a time of day, a location of the data processing system, or a bandwidth of said network interface, and wherein said Multiplexed Bookmark software entity designates one of the plurality of Bookmarks as a currently active Bookmark based on at least one of a current time of day, a current location of data processing system, or a current bandwidth of the network interface.

28. A data processing system as in claim 19, wherein individual ones of the data communications network sites are each comprised a World Wide Web Server.

29. A World Wide Web (WWW) Server of a type that is coupled to a data communications network and that maintains WWW pages, at least some of which contain at least one Hyperlink, comprising:
a data communications network interface for receiving a Request for a particular Hyperlink from a data processing system connected to the World Wide Web; and
a data processor for automatically formatting a response to the Request for the particular Hyperlink in accordance with at least one criterion that is associated with a requestor of the Hyperlink, the at least one criterion being automatically determined by the data processor based on information encoded in the Request, the criterion being specified in accordance with at least one of a plurality of variables associated with the data processing system.

30. A WWW Server as in claim 29, wherein the operation of the data processor is invoked in response to the requestor selecting a multiplexed Hyperlink.

31. A WWW Server as in claim 29, wherein the at least one criterion is a time of day at a location of the requestor.

32. A WWW Server as in claim 29, wherein the at least one criterion is a location of the requestor.

33. A WWW Server as in claim 29, wherein the at least one criterion is a bandwidth of a data communications link between the requestor and the data communications network.

34. A WWW Server as in claim 29, wherein the Request includes information that is descriptive of at least one of a time of day at the requestor, a location of the requestor, or a bandwidth of a data communications link between the requestor and the data communications network, and wherein data processor formats the response to the Request for the particular Hyperlink in accordance with the received information.

35. A WWW Server as in claim 29, wherein the Request includes a network address of the requestor, and wherein said data processor is responsive to the received network address for deriving information from the network address that is descriptive of the at least one criterion.

36. A WWW Server as in claim 29, wherein the Request includes a network address of the requestor, and wherein said data processor is responsive to the received network address for deriving at least one of a current time of day or a current location of the requestor from the network address, and for using the derived information when formatting the response.

37. A WWW Server as in claim 29, wherein the Request includes a network address of an Intermediate Server that is coupled between the requestor and the WWW Server, and wherein said data processor is responsive to the received network address for deriving information from the network address that is descriptive of the at least one criterion.

38. A method for operating a data processing system that is coupled to a data communications network, comprising the steps of:
storing a plurality of Bookmarks individual ones of which refer to one of a plurality of data communications network sites, each of the plurality of data network communications network sites providing a link having similar types of information; and
designating one of the plurality of Bookmarks as a currently active Bookmark based on meta-data obtained from a plurality of HTML headers wherein the meta-data indicates one of a level of link security and a size of a corresponding link.

39. A method as in claim 38, wherein the meta-data also indicates a time of last update of the link.

40. A method as in claim 38, wherein the step of designating is executed periodically.

41. A method as in claim 38, wherein the step of designating is executed in response to a user selecting a Multiplexed Bookmark that is comprised of the plurality of Bookmarks.

* * * * *